April 27, 1965    S. D. KERSTEN ETAL    3,180,352
ANTI-SIPHON CHECK VALVE
Filed May 4, 1962

INVENTORS
Samuel D. Kersten
Alton F. Sautter
By: Wallenstein, Spangenberg & Hattis

United States Patent Office 3,180,352
Patented Apr. 27, 1965

3,180,352
ANTI-SIPHON CHECK VALVE
Samuel D. Kersten, Highland Park, and Alton F. Sautter, Chicago, Ill., assignors to Water Saver Faucet Co., Chicago, Ill., a corporation of Illinois
Filed May 4, 1962, Ser. No. 192,520
2 Claims. (Cl. 137—218)

This invention relates to an improved valve for securing unidirectional flow of fluids in hydraulic system conduits. In its preferred form, the improved valve of this invention acts both as a back-flow preventing valve and a vacuum breaker.

It is common to incorporate back-flow preventing apparatus in a fluid supply line of a hydraulic system to remove the risk of reverse flow of fluid into the supply line due to the existence of low pressure conditions in the system which would otherwise permit this to occur. Such back-flow preventing apparatus frequently includes a valve suitably positioned in the fluid supply line, the valve being opened under forward fluid pressure and closed under vacuum conditions or back pressure. Additionally, such apparatus commonly includes vents which are covered during forward fluid pressure by a movable valve body and uncovered under zero or back pressure to expose the downstream fluid carrying conduits to atmospheric pressure. Obviously, this back-flow preventing apparatus must be exceedingly reliable, have a long service life, and be substantially free from maintenance problems. Also, the movable valve body generally incorporated in such apparatus should be quick-acting since delayed action thereof results in the momentary escape of water through the vents when the water is initially turned on.

While numerous back-flow preventing valves, more commonly referred to as vacuum breaker valves, now available perform satisfactorily under average or normal flow rates, they do not perform to best advantage under those minimal flow rates consistent with the practical operation of such valves. In general, under such conditions, water tends to leak through the vents, and/or the movable valve body may "sputter" or "chatter" as it shifts between a seated and unseated position in the valve. The conditions under which such undesirable functioning of the valve occurs frequently are encountered in laboratories where controlled procedures require reduced water flow rates for extended periods. Not infrequently in such environs direct withdrawal of water from the supply line to the scientific apparatus involved is not practical due to the functional inadequacies of the typical vacuum breaker valve.

It is an object of this invention to provide an improved back-flow preventing valve which is extremely sensitive to the lowest practical forward fluid pressures in a hydraulic system.

It is also an object of this invention to provide an improved back-flow preventing valve which is extremely quick and positive in its action both under forward fluid pressure and zero or back pressure.

It is another object of the present invention to provide an improved back-flow preventing apparatus which is reliable, has a long service life, and is substantially free of maintenance problems.

It is a further object of this invention to provide an improved back-flow preventing valve, the internally movable components of which are of lightweight, rugged construction and simple and inexpensive to manufacture.

In accordance with the present invention, the water-conveying valve body passageway has a movable, non-metallic, valve holding element which is buoyant in water and which is adapted under forward fluid pressure to float bodily to a downstream position to seat in fluid sealing relation against an upper annular valve seat to seal-off the valve body passageway from the atmosphere, and under vacuum conditions or back pressure to an upstream position to seat in fluid sealing relation against a lower annular valve seat spaced from and coaxial with the upper annular seat. The valve holding element advantageously is a unitary or single piece structure fabricated of a suitable thermoplastic or thermosetting plastic material which is resistant to corrosion, is rigid or semi-rigid in character, and is freely buoyant in water. The molded structure especially desirably has a substantially cylindrical skirted section which may be conveniently described as cup-shaped, the inner surface of the depending side wall portion thereof tapering outwardly from the central portion of the section. The inner and outer surfaces of the central portion of the skirted section of the buoyant element each has a resilient valve disc removably positioned thereat. The valve disc positioned at the inner surrace of the skirted portion is releasably retained on the element by a substantially frusto-conically shaped, downwardly directed extension coaxially disposed with respect to the skirted portion. The valve disc positioned at the upper or outer surface of the skirted section is releasably held in an annular groove formed by two raised integral disc-shaped portions of different thicknesses. Extending upwardly from, and continuous with, the uppermost of these disc-shaped portions is an elongated, substantially cylindrical pin which is adapted to be received by and move reciprocatingly in a guide sleeve member centrally disposed with relation to the upper annular seat in the valve body passageway. The lightweight, buoyant properties of the non-metallic valve holding element are enhanced by providing it with a centrally located bore which extends upwardly into the element. The valve holding element is extremely sensitive to low forward fluid pressures, and quickly floats bodily upwardly in the valve body passageway to seat against the upper annular seat to seal off the passageway from atmospheric pressure. Leakage from the vent openings and "chattering" frequently occurring at low pressures in conventionally constructed valves is no longer a problem due to the fast and positive action of the floatable element. Its integral construction from low cost, non-metallic materials makes it simple and economical to manufacture and therefore makes the valve body of this invention less expensive than vacuum breaker valves heretofore used.

Other objects, advantages and features of the invention will become apparent upon making reference to the specification to follow, the claims and drawings wherein, FIG. 1 is a view in perspective of an embodiment of the back-flow preventing valve of this invention;

Figure 1:
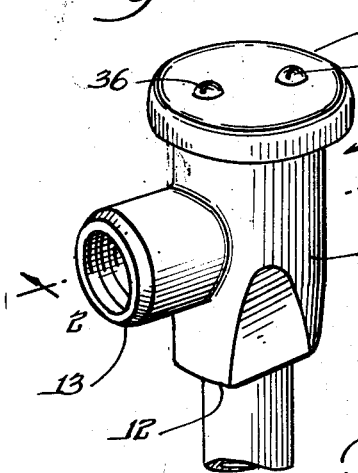

FIG. 1 of the drawings illustrates a water-conveying valve body incorporating the unique buoyant valve holding element of this invention. The valve body, designated generally at 10, comprises housing or casing 11 having an internally threaded water inlet 12, and a laterally or transversely disposed internally threaded water outlet 13. A skirted vent cap or bonnet 14 is suitably positioned at the upper portion of the casing 11. The lower portion of the casing 11 may be chamfered as illustrated to accommodate the jaws of a wrench or the like to facilitate installation of the valve body in the supply or feed line of a hydraulic system.

Figure 2:
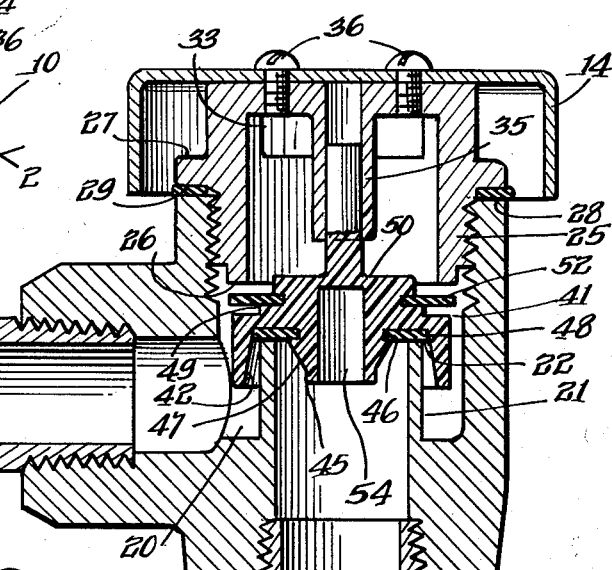
FIG. 2 is a vertical sectional view taken substantially along line 2—2 of FIG. 1 showing the position of the buoyant valve holding element in the absence of forward fluid pressure.
Figure 3:
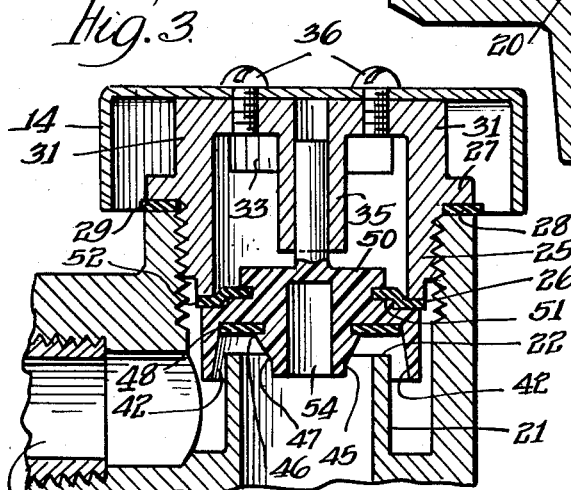
FIG. 3 is a fragmentary vertical sectional view corresponding to FIG. 2 showing the position of the buoyant valve holding element under forward fluid pressure.

As shown in FIGS. 2 and 3, the casing 11 defines a fluid conducting passageway 20 which communicates with inlet 12 and outlet 13. In substantially coaxial alignment with the inlet 12 of the casing 11, and extending upwardly into the passageway 20, is a rimmed, tubular portion 21 having an annular seating surface 22. The portion 21 may be integral with the casing 11 or it may be secured therein in any other suitable manner.

Threadedly engaging with the casing 11 at the upper portion of the passageway 20, and coaxially positioned in relation to the portion 21, is a tubular element 25 having an annular seating surface 26 of greater diameter than the seating surface 22 of the portion 21. The element 25 desirably has an annular flange 27, the lower face of which becomes juxtaposed to the upper annular shoulder 28 of the casing 11 when the element 25 is engaged in the casing. A washer or packing, indicated at 29, of any suitable material may be interposed between the flange 27 and the shoulder 28 to form, under compression, a sealed junction.

Figure 4:
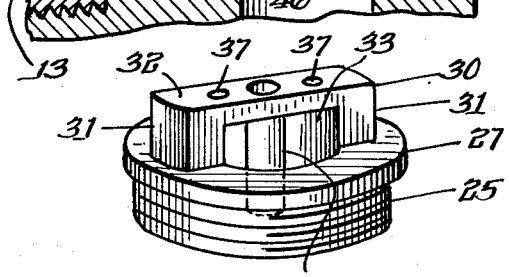
FIG. 4 is a view in perspective of the upper annular valve seat structure.

Joined to the element 25 at the upper surface of the flange 27 is a substantially U-shaped vent-forming portion 30 having downwardly extending arms 31—31 which are bridged or connected by a bar 32 (see FIG. 4). The arms 31—31 and the bar 32, together with segments of the innermost edge or rim of the upper surface of the flange 27, defines a pair of vent openings 33—33 communicating with the passageway 20 through the tubular element 25, the vent openings 33—33 serving to vent the passageway 20 to atmospheric pressure. Centrally disposed in and joined to the lower surface of the bar 32, and extending downwardly into the tubular element 25, is a substantially cylindrical, open ended guide sleeve 35, the function of which will be made clear as the description proceeds.

The portion 30 is adapted to receive the skirted vent cap 14 which is of sufficiently larger internal diameter than the upper annular shoulder 28 of the casing 11 to permit flow of air from the atmosphere to and through the vent openings 33—33. In the embodiment illustrated, the cap 14 is attached to the portion 30 by means of screws 36—36 engaging with tapped bores 37—37 in the bar 32. Obviously, the cap 14 may be secured to the portion 30 in any other suitable manner or may be made integral therewith, if desired.

Figure 5:
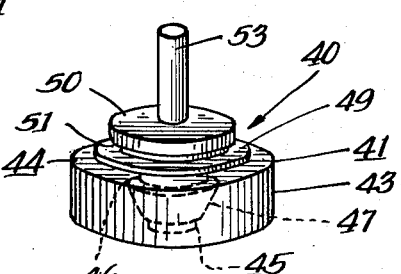
FIG. 5 is a view in perspective of the buoyant valve holding element with the valve discs removed.

Turning now to the passageway 20 and the opposed, substantially coaxial seating surface 22 and 26 positioned therein, and referring particularly to FIGS. 2, 3 and 5 of the drawings, in accordance with the preferred embodiment of this invention, the valve body 10 is provided with a unique non-metallic, buoyant valve holding element 40, which under extremely low forward fluid pressure, is adapted to float bodily to an upper or downstream position to seat against the seating surface 26, and under vacuum conditions or back pressure is adapted to move downwardly to an upstream position where it seats against seating surface 22. The element 40 advantageously is a unitary or single piece structure fabricated of a suitable thermoplastic or thermosetting plastic substance which is resistant to corrosion, is rigid or semi-rigid in character, and is freely buoyant in water. Examples of especially desirable materials having utility for the purposes of this invention are nylon and "Teflon."

The valve holding element 40 advantageously is provided with a skirted or downwardly extending substantially cylindrical, cup-shaped section 41, the inner surface 42 of the wall forming portion 43 of which is tapered outwardly, and the central portion 44 of which has a diameter greater than that of the internal diameter of the tubular portion 21 of the casing 11 and the tubular element 25. Continuous with the central portion 44 of the section 41 and extending downwardly therefrom is a centrally disposed, substantially frusto-conically shaped portion 45. An annular groove 46 at the base of the outwardly flared peripheral wall 47 of the portion 45 is adapted to retain at the inner surface of the central portion 44 a valve closure ring or disc 48. The valve disc 48 is fabricated of any suitable flexible or elastic material such as rubber to enable it to be conveniently removed and replaced, and to provide an effective seal when seated on the surface 22.

Extending upwardly from the upper surface of the central portion 44 of the section 41 are integral, disc-shaped or circular portions 49 and 50, of lesser diameter than the central portion 44. The portions 49 and 50 define an annular groove 51 which receives valve closure ring or disc 52, similar to disc 48, having a diameter greater than that of the central portion 44 of valve holding element 40. Continuous with the disc-shaped portion 50 and extending upwardly therefrom is a substantially cylindrical pin 53, the dimensions of which are such that it will be slidably retained in the guide sleeve 35 as the valve holding element 40 moves reciprocatingly between the seating surfaces 22 and 26 in response to pressure differentials occurring in the hydraulic system incorporating the valve body 10. The overall lightweight, buoyant characteristics of the element 40 advantageously are enhanced by providing the element with a centrally disposed bore 54 which extends upwardly through the element 40 and terminates in the upper regions of the disc-shaped portions 50 thereof.

When the valve body 10 is connected into a hydraulic system, and flow of water is effected through the inlet 12 thereof into the tubular portion 21, the valve holding element 40 responds instantaneously to the upwardly directed fluid pressure and rapidly floats bodily in the passageway 20 until the valve disc 52 is forced into fluid sealing engagement with the annular seating surface 26. In this position the resilient, flexible valve disc 52 is distended downwardly along the shoulder formed by the raised portion 49, the lower surface of the valve disc 52 proximal to the periphery thereof being compressed against the adjacent area of the upper surface of the central portion 44. The upper surface of the disc 52 abuts the seating surface 26 and makes contact with a portion of the inner wall of the element 25 adjacent the surface 26 (see FIG. 3). Thus, optimum use is made of the disc 52 to achieve a highly effective seal.

When the valve holding element 40 is in fluid sealing engagement in relation to the upper seating surface 26, the annular side wall forming portion 43 of the section 41 surrounds the lower annular seating surface 22. Water passing through the portion 21 is directed by the outwardly tapered annular wall 42 of the conically shaped portion 45, around the seating surface 22, and against the valve disc 48 and the outwardly tapered inner surface 42 of the portion 43 into the passageway 20. The huddling action produced in this manner substantially reduces any turbulence resulting from the abrupt change in direction of flow of the water, and achieves a smooth, uniform current. From the passageway 20, the water courses its way through the outlet 13 to the water main outlet.

If for any reason a vacuum or low pressure condition occurs in the supply line of the water system with which the valve body 10 is connected, the element 40 will immediately descend to to the position illustrated in FIG. 2. In this position the vent openings 33—33 which were sealed off from the passageway 20 by the element 40 acting under forward fluid pressure are now in communication with the passageway 20. Air at atmospheric pressure acting on the element 40 forces the valve disc 48 thereof against the seating surface 22 to achieve a fluid seal. Thus, any pressure imbalances in the system are overcome and contamination of the fluid supply line and source is effectively prevented. Restoration of flow of fluid from the inlet side of the valve body against the element 40 closes off the ingress of air into the system and the functioning of the valve body can again proceed as hereinabove described.

The valve holding element 40 is extremely sensitive to pressure differentials in the hydraulic system to which the valve body 10 is connected. Its buoyant character enables it to react rapidly and positively under very low forward fluid pressures resulting in no leakage of fluid through the vent openings and without the "chattering" effect frequently encountered with standard valves at such pressures. The resilient, rugged character of the non-metallic, non-corrosive material of which the element is made substantially reduces maintenance costs. Its unitary construction from cheaper, non-metallic material make it simpler and less expensive to manufacture.

It should be understood that numerous modifications may be made of the preferred form of the invention above described without deviating from the broader aspects of the invention.

We claim:

1. In a water-conveying valve body forming an enclosed passageway having an inlet and an outlet, said passageway having vent openings for venting the valve body passageway to atmospheric pressure, back-flow preventing means comprising: an elongated, substantially cylindrical, open-ended valve seat in said passageway joined to the valve body at the inlet thereof, a second valve seat spaced from and coaxial with said elongated valve seat, a downwardly extending tubular member substantially centrally disposed with respect to said second valve seat, the lower end of said tubular member terminating at a point above the lower end of said second valve seat, a lightweight, non-metallic valve holding element buoyant in water positioned between said valve seats, said valve holding element having a body portion of greater diameter than that of said elongated valve seat, a downwardly extending wall portion joined to said body portion, the inner surface of said wall portion tapering downwardly and outwardly from the lower surface of said body portion and being spaced from the outer wall of said elongated valve seat when the valve holding element is seated thereon, said wall portion having a length such that when the non-metallic valve holding element is moved by the initial flow of water through said inlet away from said elongated valve seat toward said second valve seat the lower margin of said wall portion will at all times during movement of the valve holding element be below the upper margin of said elongated valve seat to impede the flow of water around said wall portion thereby to prevent water entering the valve body from reaching said vent openings before the valve holding element is in seated engagement with relation to said second valve seat, means joined to the lower surface of said body portion and extending downwardly therefrom to a point above the lower margin of said wall portion, said means being hollow and having an opening at the lower end thereof whereby water flowing into said inlet of said passageway can pass upwardly into the interior of said means to enhance the floatability of said valve holding element, said means further having upwardly and outwardly diverging walls terminating at a point at the lower surface of said body portion spaced from the upper margin of the inner surface of said wall portion, said diverging walls of said means in cooperation with the inner surface of said wall portion serving to substantially reduce any turbulence in water passing first upwardly and then downwardly thereagainst through said inlet of said valve thereby to achieve a smooth, uniform water current flow at substantially all water flow rates, a resilient valve member removably held by said means at the lower surface of said body portion for forming a fluid-tight seal with said elongated valve seat when the valve holding element is positioned thereon, means on the upper surface of said body portion for removably retaining a second resilient valve member in spaced relation with respect to said upper surface of said body portion, said second valve member serving to form a fluid-tight seal when said valve holding element is seated thereon, and means joined to said second mentioned means extending upwardly therefrom into said tubular member and having dimensions such that it can move reciprocably therein, said valve holding element under minimal forward fluid pressures substantially instantaneously floating bodily to a downstream position to distendedly seat the resilient valve member positioned at the upper surface of said body portion against said second valve seat to seal-off the valve body passageway from said vent openings, and under zero or back pressure to an upstream position to seat the resilient valve member positioned at the lower surface of said body portion against said elongated valve seat to vent the valve body passageway to atmospheric pressure.

2. In a water-conveying valve body forming an enclosed passageway having an inlet and an outlet, said passageway having vent openings for venting the valve body passageway to atmospheric pressure, back-flow preventing means comprising: an elongated, substantially cylindrical, open-ended valve seat in said passageway joined to the valve body at the inlet thereof, a second, substantially cylindrical open-ended valve seat spaced from and coaxial with said elongated valve seat, a downwardly extending guide sleeve member centrally disposed with respect to said second valve seat, the lower open end of the guide sleeve member terminating at a point above the valve seating surface of said second valve seat, a one-piece plastic valve holding element buoyant in water positioned between said valve seats, said valve holding element having a circular central portion of greater diameter than that of said elongated valve seat, a downwardly extending wall portion of substantial length joined to said central portion of the valve holding element at the periphery thereof, the inner surface of said wall portion tapering downwardly and outwardly from the lower surface of said central portion and being spaced from the outer wall of said elongated valve seat when the valve holding element is seated thereon, said wall portion having a length such that when the non-metallic valve holding element is moved by the initial flow of water through said inlet away from said elongated valve seat toward said second valve seat the lower margin of said wall portion will at all times during movement of the valve holding element be below the upper margin of said elongated valve seat to impede the flow of water around said wall portion thereby to prevent water entering the valve body from reaching said vent openings before the valve holding element is in seated engagement with relation to said second valve seat, a substantially frusto-conically shaped extension joined at its base to the lower surface of said central portion of the valve holding element and extending downwardly therefrom to a point above the lower margin of said wall portion, said frusto-conically shaped extension having a centrally disposed bore extending upwardly therethrough and into said central portion, a resilient valve disc removably secured at the base of said frusto-conically shaped extension for forming a fluid-tight seal with said elongated valve seat when the valve holding element is positioned thereon, lower and upper disc-shaped portions of different diameters joined to the upper surface of the central portion of the valve holding element forming an annular groove, a second resilient valve disc removably engaged in the annular groove formed by said disc-shaped portions and spaced from the upper surface of said central portion for forming a fluid-tight seal with said second valve seat, and an elongated, substantially cylindrical member joined to and extending upwardly from the uppermost of said disc-shaped portions into said guide sleeve member, said elongated, substantially cylindrical member being of lesser diameter than the opening in said sleeve member to enable it to move reciprocably in said guide sleeve member, said valve holding element under minimal forward fluid pressures substantially instantaneously floating bodily to a downstream position to distendedly seat the valve disc positioned at the upper surface of said central portion against said second valve seat to seal-off the valve body passageway from said vent openings, and under zero or back pressure to an upstream position to seat the valve disc positioned at the lower surface of said central portion against said elongated valve seat to vent the valve body passageway to atmospheric pressure.

References Cited by the Examiner

UNITED STATES PATENTS

| | | | |
|---|---|---|---|
| 1,688,876 | 10/28 | Palmer | 251—356 X |
| 1,758,471 | 5/30 | Schmidt | 251—334 X |
| 1,818,856 | 8/31 | Langdon | 251—333 X |
| 2,927,598 | 3/60 | Thompson | 137—218 |
| 2,990,843 | 7/61 | Smith | 137—218 |

ISADOR WEIL, *Primary Examiner.*

MARTIN P. SCHWADRON, *Examiner.*